(12) United States Patent
Gao et al.

(10) Patent No.: US 12,515,639 B2
(45) Date of Patent: Jan. 6, 2026

(54) VEHICLE CONTROL BASED ON DYNAMICALLY CONFIGURED LONGITUDINAL WHEEL SLIP LIMITS

(71) Applicant: Volvo Truck Corporation, Gothenburg (SE)

(72) Inventors: Yangyan Gao, Palo Alto, CA (US); Leon Henderson, Härryda (SE); Jakub Prokes, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 196 days.

(21) Appl. No.: 18/287,496

(22) PCT Filed: Apr. 26, 2021

(86) PCT No.: PCT/EP2021/060858
§ 371 (c)(1),
(2) Date: Oct. 19, 2023

(87) PCT Pub. No.: WO2022/228653
PCT Pub. Date: Nov. 3, 2022

(65) Prior Publication Data
US 2024/0182019 A1 Jun. 6, 2024

(51) Int. Cl.
*B60W 30/045* (2012.01)
*B60T 8/1755* (2006.01)
*B60W 30/18* (2012.01)

(52) U.S. Cl.
CPC ....... *B60W 30/045* (2013.01); *B60T 8/17552* (2013.01); *B60W 30/18145* (2013.01);
(Continued)

(58) Field of Classification Search
None
See application file for complete search history.

(56) References Cited

U.S. PATENT DOCUMENTS 11,938,923 B1 * 3/2024 Chen ............... B60W 30/02
12,091,114 B2 * 9/2024 Fu .................. B60W 10/18
(Continued)

FOREIGN PATENT DOCUMENTS

CN 103879401 A 6/2014
CN 109017446 B * 10/2020 ........... B60W 30/10
(Continued)

OTHER PUBLICATIONS

Communication pursuant to Rules 161(1) and 162 EPC for European Patent Application No. 21722407.0, mailed Dec. 5, 2023, 3 pages.
(Continued)

*Primary Examiner* — Kevin R Steckbauer
(74) *Attorney, Agent, or Firm* — Withrow & Terranova, PLLC

(57) ABSTRACT

A computer-implemented method performed in a vehicle control unit for controlling motion of a heavy-duty vehicle, the method comprising obtaining a vehicle motion request, wherein the vehicle motion request is indicative of a target curvature $c_{req}$ and a target acceleration $a_{req}$, determining a motion support device (MSD) control allocation ($T_i/\lambda_i/\omega_i/\delta_i$) based on the vehicle motion request, determining a dynamic longitudinal wheel slip limit ($\lambda_{lim}/\omega_{lim}$) based on the vehicle motion request and separately from the MSD control allocation, where the dynamic longitudinal wheel slip limit increases with a decreasing target curvature, and controlling the motion of the heavy-duty vehicle based on the MSD control allocation constrained by the dynamic longitudinal wheel slip limit.

14 Claims, 6 Drawing Sheets

(52) U.S. Cl.
CPC .... *B60T 2201/16* (2013.01); *B60W 2300/125* (2013.01); *B60W 2552/30* (2020.02); *B60W 2720/26* (2013.01); *B60W 2720/30* (2013.01)

(56) References Cited

U.S. PATENT DOCUMENTS

| | | | | |
|---|---|---|---|---|
| 12,122,359 | B2* | 10/2024 | Chen | B60W 10/20 |
| 12,330,653 | B2* | 6/2025 | Laine | B60W 10/04 |
| 12,358,509 | B2* | 7/2025 | Gao | B60T 8/17552 |
| 2020/0290588 | A1 | 9/2020 | Kallstrand et al. | |
| 2020/0369226 | A1 | 11/2020 | Ferencz | |
| 2022/0306117 | A1* | 9/2022 | Laine | B60W 10/184 |
| 2023/0063613 | A1* | 3/2023 | Gao | B60W 30/18172 |
| 2024/0132152 | A1* | 4/2024 | Fu | B60W 30/02 |
| 2024/0182019 | A1* | 6/2024 | Gao | B60W 30/18145 |
| 2024/0270235 | A1* | 8/2024 | Chen | B60W 10/08 |

FOREIGN PATENT DOCUMENTS

| | | | | |
|---|---|---|---|---|
| CN | 109017447 B * | 8/2021 | | B60L 15/20 |
| CN | 109017804 B * | 1/2022 | | B60L 15/20 |
| CN | 109017759 B * | 4/2022 | | B60W 30/02 |
| CN | 109017760 B * | 4/2022 | | B60W 30/10 |
| CN | 109017778 B * | 4/2022 | | B60W 30/10 |
| CN | 115729098 A * | 3/2023 | | B60W 50/14 |
| CN | 116279408 A * | 6/2023 | | B60L 3/10 |
| EP | 1207090 A2 | 5/2002 | | |
| EP | 2858060 A2 | 4/2015 | | |
| EP | 3371015 A1 | 9/2018 | | |
| EP | 4140839 A1 * | 3/2023 | | B60W 50/14 |
| EP | 4140839 B1 * | 10/2024 | | B60W 50/14 |
| EP | 4330097 B1 * | 5/2025 | | B60W 30/18145 |
| JP | 2008247067 A | 10/2008 | | |
| JP | 2023035900 A * | 3/2023 | | B60W 50/14 |
| KR | 20230033589 A * | 3/2023 | | B60W 50/14 |
| WO | 2019072379 A1 | 4/2019 | | |
| WO | 2020249239 A1 | 12/2020 | | |
| WO | WO-2022228653 A1 * | 11/2022 | | B60W 30/045 |
| WO | WO-2024110363 A1 * | 5/2024 | | B60K 6/20 |

OTHER PUBLICATIONS

Fredriksson J. et al., "Wheel Force Distribution for Improved Handling in a Hybrid Electric Vehicle using Nonlinear Control," 43rd IEEE Conference on Decision and Control, Dec. 14-17, 2004, Atlantis, Paradise Island, Bahamas, IEEE, pp. 4081-4086.

Gao, Y. et al., "Modified Hamiltonian Algorithm for Optimal Lane Change with Application to Collision Avoidance," MM Science Journal, Mar. 2015, pp. 576-584.

Gao, Y. et al., "Optimal control of brakes and steering for autonomous collision avoidance using modified Hamiltonian algorithm," Vehicle System Dynamics, vol. 57, No. 8, pp. 1224-1240.

Gao, Y. et al., "Optimal Control of Vehicle Dynamics for the Prevention of Road Departure on Curved Roads," IEEE Transactions on Vehicular Technology, vol. 68, No. 10, Oct. 2019, IEEE, pp. 9370-9384.

Gao, Y., "Vehicle Motion and Stability Control at the Limits of Handling via the Modified Hamiltonian Algorithm: Methodology and Applications," Doctoral Thesis, University of Lincoln, College of Science, School of Engineering, Aug. 2018, 183 pages.

Laine, L. et al., "Control Allocation based Electronic Stability Control System for a Conventional Road Vehicle," Proceedings of the 2007 IEEE Intelligent Transportation Systems Conference, Sep. 30-Oct. 3, 2007, Seattle, WA, IEEE, pp. 514-521.

Pacejka, H., "Tire and Vehicle Dynamics," 3rd Edition, Apr. 2012, Elsevier B.V., 629 pages.

International Search Report and Written Opinion for International Patent Application No. PCT/EP2021/060858, mailed Jul. 28, 2021, 15 pages.

Written Opinion for International Patent Application No. PCT/EP2021/060858, mailed Feb. 11, 2022, 5 pages.

International Preliminary Report on Patentability for International Patent Application No. PCT/EP2021/060858, mailed Aug. 31, 2023, 18 pages.

* cited by examiner

VEHICLE CONTROL BASED ON DYNAMICALLY CONFIGURED LONGITUDINAL WHEEL SLIP LIMITS

This application is a 35 USC 371 national phase filing of International Application No. PCT/EP2021/060858, filed Apr. 26, 2021, the disclosure of which is incorporated herein by reference in its entirety.

TECHNICAL FIELD

The present disclosure relates to vehicle motion management for heavy-duty vehicles, i.e., coordinated control of motion support devices such as service brakes, propulsion devices and power steering. The invention can be applied in heavy-duty vehicles such as trucks, buses, and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSDs). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion and power management (VMPM) functionality executed, e.g., on a central vehicle control unit (VCU) or distributed over a network of electronic control units (ECU) relies on combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy-duty vehicle. The VMPM control may advantageously be based on wheel speed requests or wheel slip requests transmitted from the VMPM to MSD control units which control the various MSDs by low delay—high bandwidth control loops targeted at maintaining wheel behavior as close as possible to the requested wheel slip or wheel speed values. VMPM control may also comprise more traditional torque-based requests that are transmitted from the VMPM to the MSD control units.

WO2020249239 A1 discloses a method for validating models for vehicle dynamics.

EP3371015 A1 discloses an automatic brake system wherein the braking strategy is adapted based on an estimated brake force capacity and a predicted required lateral tyre force.

At least partly due to the complexity inherent in these advanced motion management functions, additional safety mechanisms are often desired. For instance, there is a need for methods and control architectures which can prevent these advanced motion management functions from inadvertently locking wheels and/or introducing an undesired yaw motion by the vehicle.

SUMMARY

It is an object of the present disclosure to provide control units and methods which facilitate vehicle control in a safe, efficient, and robust manner.

This object is at least in part obtained by a computer-implemented method performed in a vehicle control unit for controlling motion of a heavy-duty vehicle. The method comprises obtaining a vehicle motion request, wherein the vehicle motion request is indicative of a target curvature and a target acceleration according to which the vehicle is to be controlled and determining a motion support device (MSD) control allocation based on the vehicle motion request. The method also comprises determining a dynamic longitudinal wheel slip limit based on the vehicle motion request, where the longitudinal wheel slip limit is determined separately from the MSD control allocation and where the dynamic longitudinal wheel slip limit increases with a decreasing target curvature. The method further comprises controlling the motion of the heavy-duty vehicle based on the MSD control allocation which is then constrained by the dynamic longitudinal wheel slip limit.

This way the MSD control allocation can be determined freely to meet a vehicle motion request from a higher layer in the vehicle control stack as long as the resulting wheel behavior is within the dynamically configured wheel slip limit, which greatly simplifies the required computations involved in the MSD allocation. For instance, the MSD control allocation can be determined under assumptions of linear relationships between wheel slip and wheel force, which simplifies computations since non-linear effects need not be accounted for in the allocation. As soon as wheel behavior deviates beyond the imposed slip limit, a control intervention function represented by the dynamic longitudinal wheel slip limit is triggered and assumes wheel control to, e.g., maintain a linear wheel force vs wheel slip relationship. It is an advantage that the dynamic longitudinal wheel slip limit increases with a decrease in the target curvature, since this way the overall control freedom is increased compared to the case where, e.g., a fixed dynamic slip limit is configured with a large margin to account for curvature, or a dynamic slip limit which is configured in dependence of a road friction condition, but which does not account for the desired vehicle motion. Consequently, the safety margin implied by the wheel slip limits can be decreased by the herein disclosed techniques, which is an advantage. For instance, hard braking on a straight road can now be performed with a higher slip limit, meaning more longitudinal force becomes available, since the curvature request will be small in this case.

The one or more MSDs may for instance comprise at least one service brake arranged to generate negative torque by the wheel and at least one propulsion unit arranged to generate a positive and/or a negative torque by the wheel. Thus, the proposed control units are suitable for controlling and for coordinating both propulsion devices and wheel brakes, which is an advantage. As will be explained in the following, the control methods disclosed herein can also be extended to limiting steering angles and lateral slip angle, which is an advantage.

According to aspects, the method comprises obtaining the vehicle motion request from a driver input and/or from an autonomous or semi-autonomous traffic situation management (TSM) function. Thus, advantageously, the herein disclosed methods can be applied both in legacy systems where a driver controls the vehicle, in semi-autonomous vehicles where the driver is assisted by one or more advanced driver assistance systems (ADAS), as well as in fully autonomous vehicles where no driver is present.

According to aspects, the method comprises determining the MSD control allocation based on a B-matrix control allocation method. B-matrix control allocations are commonly used in control of heavy-duty vehicles. It is an advantage that the present methods are applicable with such MSD control allocation algorithms. The method optionally comprises determining the MSD control allocation at least partly as a target wheel torque, and/or determining the MSD control allocation at least partly as a target wheel slip or wheel speed relative to ground.

According to aspects, the method comprises determining the MSD control allocation at least partly as a target steering angle. Thus, steering can also be included into the control architecture, which is an advantage.

According to aspects, the method comprises determining the dynamic longitudinal wheel slip limit based on a current wheel slip angle and on a required lateral force, where the dynamic longitudinal wheel slip limit decreases if the current wheel slip angle increases. This means that the longitudinal wheel slip limit can be increased in low slip angle conditions in order to allow vehicle control involving higher longitudinal slips, which is an advantage since it increases the vehicle maneuverability in difficult situations. Safety is maintained, since as soon as a slip angle in introduced, the wheel slip limit quickly decreases.

According to aspects, the method comprises determining a dynamic steering angle limit in addition to the dynamic longitudinal wheel slip limit. This dynamic steering angle limit makes sure that the vehicle can be safely controlled, and that linear vehicle behavior is maintained despite, e.g., cornering at high speed. Again, the required margins to be maintained decrease since the slip limits are dynamically configured in dependence of vehicle maneuver.

According to aspects, the method comprises determining the dynamic longitudinal wheel slip limit by executing a modified Hamiltonian algorithm (MHA). The MHA implementation has shown good results in realizing the methods proposed herein. It may also be implemented at a reasonable computational complexity, which is an advantage. Further details of the proposed modified Hamiltonian algorithms will be given below. The methods optionally comprise minimizing local Hamiltonian functions at one or more wheels, where each minimization comprises a linear search of a tyre force curve. It is an advantage that the computations can be distributed in this simple manner. Both algorithmic robustness and latency aspects are improved by this particular feature of the MHA approach.

According to aspects, the method comprises determining the dynamic longitudinal wheel slip limit based on a stability condition involving a maximum acceptable yaw moment of the vehicle. This optional feature serves to further improve the robustness and safety associated with the method.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
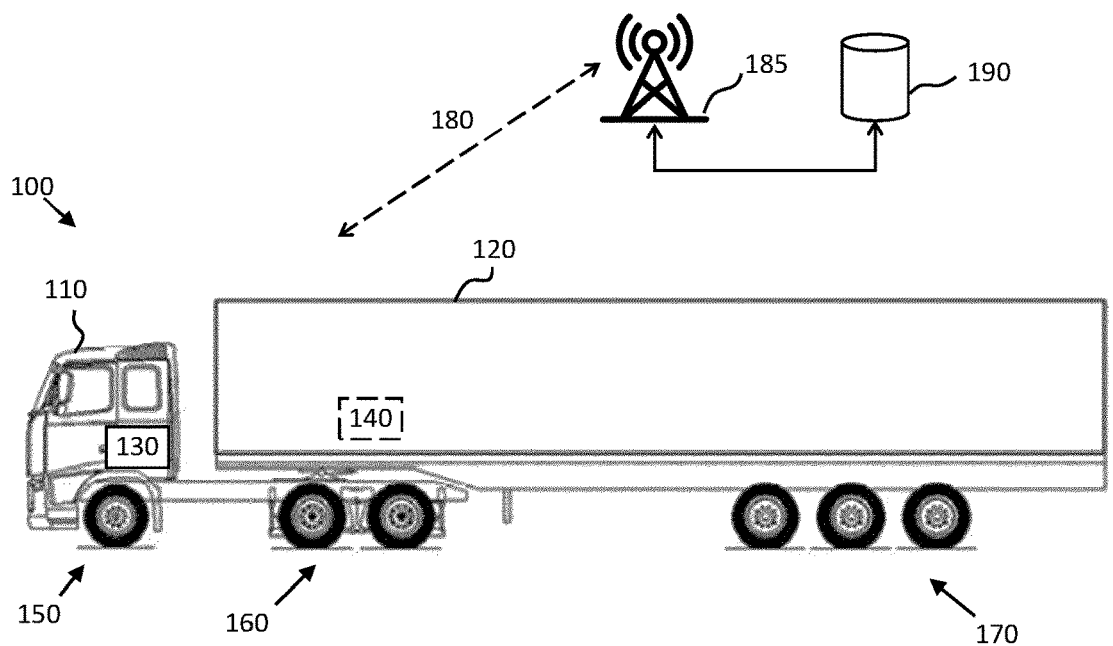
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels and at least some of which are steered wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles.

It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units, i.e., a dolly vehicle unit may be used to tow more than one trailer.

The tractor 110 comprises a vehicle control unit (VCU) 130 for controlling various kinds of functionality, i.a. to achieve propulsion, braking, and steering. Some trailer units 120 also comprise a VCU 140 for controlling various functions of the trailer, such as braking of trailer wheels, and sometimes also trailer wheel propulsion and steering. The VCUs 130, 140 may be centralized or distributed over several processing circuits, often referred to as electronic control units (ECU). Parts of the vehicle control functions may also be executed remotely, e.g., on a remote server 190 connected to the vehicle 100 via wireless link 180 and a wireless access network 185.

The VCU 130 on the tractor 110 (and possibly also the VCU 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer. A VMM function which also handles vehicle power management will be referred to herein as a vehicle motion and power management function (VMPM). It is appreciated that the VMM function may be operated as a stand-alone function or as part of a VMPM function, without loss in generality.

Figure 2:
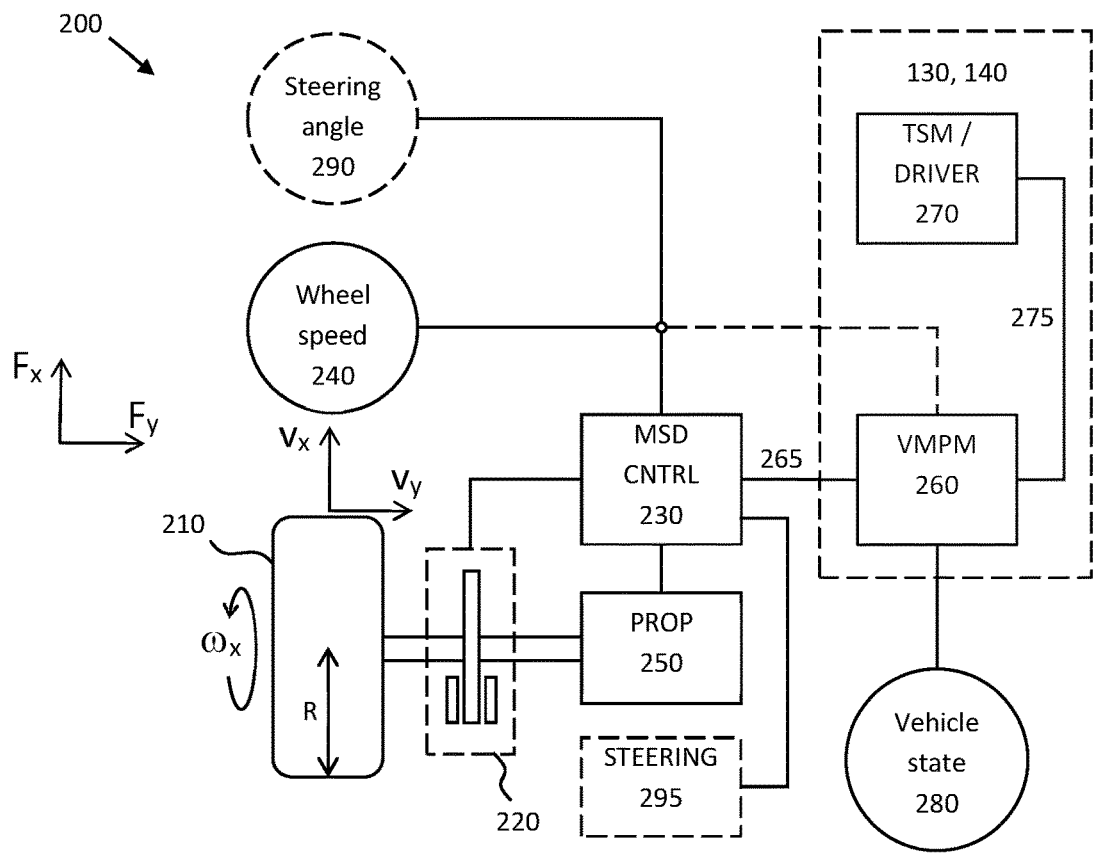
FIG. 2 schematically illustrates a motion support device arrangement.

FIG. 2 schematically illustrates functionality 200 for controlling a wheel 210 on the vehicle 100 by some example MSDs here comprising a friction brake 220 (such as a disc brake or a drum brake) and a propulsion device 250. The friction brake 220 and the propulsion device are examples of wheel torque generating devices, which may also be referred to as actuators and which can be controlled by one or more motion support device control units 230. The control is based on, e.g., measurement data obtained from a wheel speed sensor 240 and from other vehicle state sensors 280, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 230 may be arranged to control one or more actuators. For instance, it is not uncommon that an MSD control unit 230 is arranged to control both wheels on an axle.

The functionality 200 optionally also comprises control of steering angle via a power steering arrangement 295. This control may at least in part be based on a steering angle sensor 290. The control of steering by the MSD control unit 230 may be a direct control of steered angle δ, or via a steering angle limit imposed on some other steering angle control unit or arrangement.

The TSM function 270 plans driving operation with a time horizon of, e.g., 10 seconds or so. This time frame corresponds to, e.g., the time it takes for the vehicle 100 to negotiate a curve or the like. The vehicle maneuvers, planned and executed by the TSM, can be associated with acceleration profiles and curvature profiles which describe a desired target vehicle velocity and turning to be maintained for a given maneuver. The TSM continuously requests the desired acceleration profiles $a_{req}$ and curvature profiles $c_{req}$ from the VMPM function 260 which performs force allocation to meet the requests from the TSM in a safe and robust manner. The VMPM function 260 continuously feeds back capability information to the TSM function detailing the current capability of the vehicle in terms of, e.g., forces, maximum velocities, and accelerations which can be generated. The VMPM function operates on a time-scale of below one second or so and will be discussed in more detail below.

Acceleration profiles $a_{req}$ and curvature profiles $c_{req}$ may also be obtained from a driver of the heavy-duty vehicle via normal control input devices such as a steering wheel, accelerator pedal and brake pedal. The source of said acceleration profiles and curvature profiles is not within scope of the present disclosure and will therefore not be discussed in more detail herein.

Figure 3:
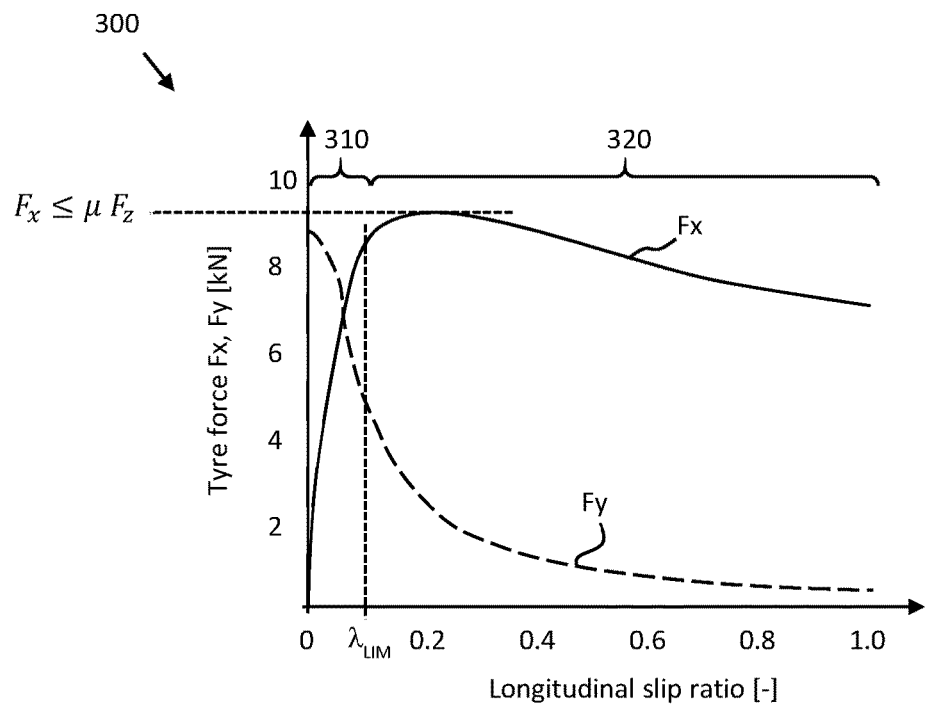
FIG. 3 is a graph showing tyre force as function of longitudinal wheel slip.

FIG. 3 is a graph showing an example 300 of achievable tyre force as function of wheel slip. The longitudinal tyre force Fx shows an almost linearly increasing part 310 for small wheel slips, followed by a part 320 with more non-linear behaviour for larger wheel slips. The obtainable lateral tyre force Fy decreases rapidly even at relatively small longitudinal wheel slips. It is desirable to maintain vehicle operation in the linear region 310, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 320 is seen. Control of a vehicle in this region may be difficult and is therefore often avoided. It may be interesting for traction in off-road conditions and the like where a larger slip limit for traction control might be preferred, but not for on-road operation.

A safety margin is often used with the slip limit in order to guarantee that the vehicle does not end up in the non-linear region 320, and can generate sufficient lateral force to, e.g., perform a cornering manoeuvre. This safety margin of course reduces the slip limit, which in turn means that the force generation capability of the vehicle decreases. It is desired to keep this safety margin as small as possible.

Some of the techniques described herein rely on the realization that, for some manoeuvres, it is absolutely imperative that large lateral forces can be generated, such as during cornering. However, if the TSM function requests hard braking on a straight road without any associated curvature request, then no significant amounts of lateral forces will be required. This means that it can be advantageous to configure the slip limit in a dynamic fashion, such that the current slip limit $\lambda_{LIM}$ is determined in dependence of the requests from the TSM layer. This way the longitudinal slip limit can be configured to increase with a decreasing target curvature and decrease with an increasing target curvature, thus allowing more longitudinal wheel force to be generated during maneuvers which do not require a lot of lateral wheel force. This means that a vehicle entering into a turning maneuver will have a lower slip limit configured in order to generate the required lateral forces compared to a vehicle driving on a straight road where no large lateral forces are required. A consequence of this thinking is that the above-mentioned safety margin can be reduced considerably.

This type of tyre model 300 can also be used by the VMPM 260 to generate a desired tyre force at some wheel. Instead of requesting a torque corresponding to the desired tyre force, the VMPM can translate the desired tyre force into an equivalent wheel slip (or, equivalently, a wheel speed relative to a speed over ground) and request this slip instead. The main advantage being that the MSD control device 230 will be able to deliver the requested torque with much higher bandwidth by maintaining operation at the desired wheel slip, using the vehicle speed $v_x$ and the wheel rotational velocity $\omega_x$, obtained, e.g., from the wheel speed sensor 240. The vehicle speed $v_x$ can be obtained from various vehicle sensors such as radar, lidar, and vision based sensor in combination with a global positioning system (GPS) receiver and the like.

The control unit 130, 140 can be arranged to store a pre-determined inverse tyre model $f^{-1}$ in memory, e.g., as a look-up table. The inverse tyre model is arranged to be stored in the memory as a function of the current operating condition of the wheel 210. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 210. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 210 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Inverse tyre models can be automatically configured from the remote server 190, e.g., as software updates, or manually by a technician performing vehicle routine servicing.

Figure 4:
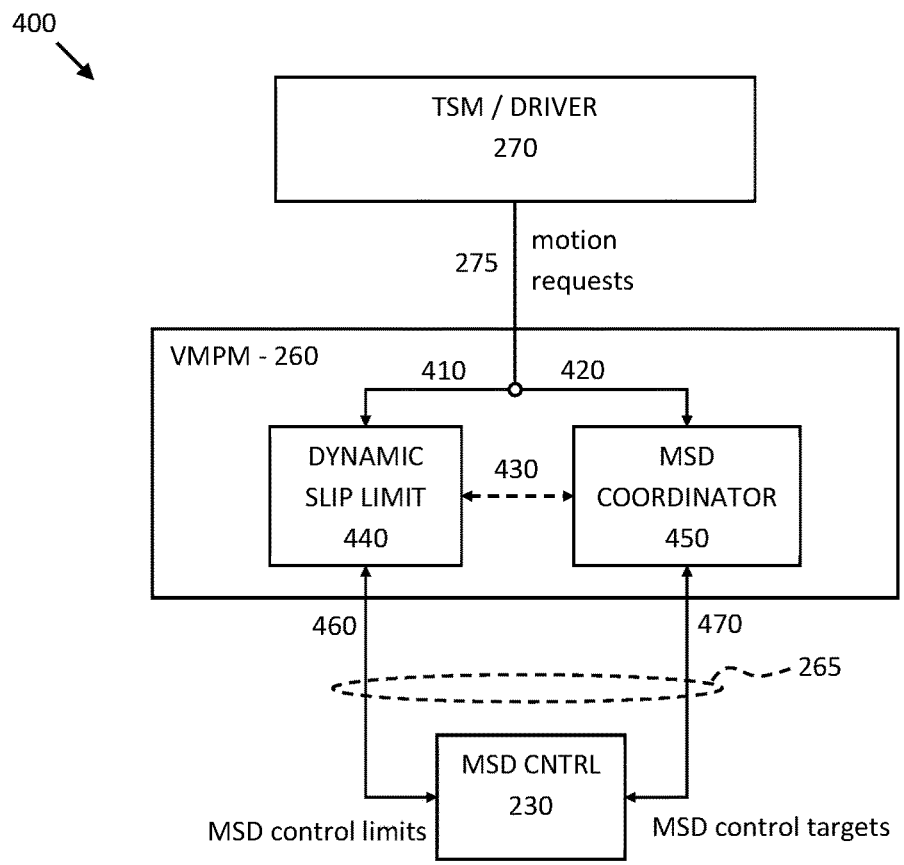
FIGS. 4-5 illustrate vehicle control function architectures.

FIG. 4 illustrates an example vehicle control function architecture, where a TSM layer 270 or a driver generates vehicle motion requests 275, which may comprise desired vehicle unit accelerations $a_{req}$ and vehicle curvatures $c_{req}$ or other types of vehicle motion requests, which together describe a desired motion by the vehicle along a desired path at a desired velocity profile. It is understood that the motion requests can be used as base for determining or predicting a required amount of lateral force which needs to be generated in order to successfully complete a maneuver. The motion requests 275 are transmitted both as a vehicle motion request 410 to a dynamic longitudinal slip limit configuration module 440 and as a corresponding vehicle motion request 420 to an MSD coordinator function 450.

The dynamic longitudinal slip limit configuration module 440 determines suitable MSD control limits 460, such as longitudinal wheel slip limits which are sent to the MSD control functions of the vehicle 100, where they are used to limit wheel behavior to be below the configured slip limits. Generally, the slip limits are determined based on the request from the TSM layer 270 in a manner which guarantees that the motion request can be completed successfully. An important relationship in this context is the reduced ability to generate lateral forces at high longitudinal wheel slip, as illustrated in FIG. 3. One way to ensure that sufficient lateral force can always be generated is, as mentioned above, to use a conservative slip limit, i.e., a marge safety margin, say on the order of 0.05 in FIG. 3, but this would also limit the longitudinal force generation capability, which of course is undesired. The dynamic longitudinal slip limit configuration module 440 disclosed herein generates dynamic wheel slip limit based on the motion requests from the TSM layer 270. This means that the dynamic longitudinal wheel slip limit can increase with a decreasing target curvature request, i.e., if no lateral forces are required for a given maneuver, then the slip limits can be increased in order to allow for more longitudinal force to be generated. For instance, suppose in a first scenario that the vehicle is driving on a straight road and suddenly needs to brake hard. Since there is no need to generate large lateral forces during the braking, a higher wheel slip limit can be used during the maneuver. On the other hand, a second scenario may involve cornering at relatively high speed, where significant lateral forces are required. Here, a lower longitudinal slip limit will be imposed by the dynamic longitudinal slip limit configuration module 440 in order to make sure that sufficient lateral force can be generated such that the request from the TSM layer 270 can be fulfilled successfully. The dynamic longitudinal slip limit configuration module 440 optionally also configures limits on steering angle. The interplay between steering angle limit and wheel slip limit can be used with advantage to improve vehicle maneuverability. For instance, a limit on steering angle may prompt the MSD coordinator function 450 to generate a yaw moment by other means, such as steer by braking.

Aspects of the methods presented herein can also be used to dynamically set lateral slip limits, in the same manner as the longitudinal slip limits. These can be dynamically set based on the overall motion target and if the main control allocator tries to (for instance) steer so much that either increasing steer angle will no longer increase lateral force, or longitudinal force requests can no longer be met, then the lateral slip angle at the steerable axles can be limited according to the lateral slip limit from the slip limit configuration module 440.

This way the MSD coordinator function 450 can be realized under the assumption that an increase in slip angle always implies an increase in lateral force. These lateral slip limits can be dynamically converted to steer angle limits which then can be used as actuator constraints for, e.g., a B-Matrix based MSD coordinator function 450 or the like.

The MSD coordinator function 450 performs MSD coordination in order to generate the global forces required to meet the motion requests from the TSM layer 270 or from the driver. This MSD coordination can be based on any force coordination routine. Advantageously, the force coordination can be performed under the assumption that, e.g., force vs slip relationships are approximately linear, and that lateral force can be generated independently of driving scenario and vehicle maneuver.

The MSD coordinator function 450 continuously receives capability reports from the MSD control units on the vehicle 100. These capabilities are used as input to the force allocation and will be affected by the imposed slip limits.

FIG. 4 also shows an optional safety signal interconnect 430 between the MSD coordinator function 450 and the dynamic longitudinal slip limit configuration module 440. This connection can be used with advantage to exchange error messages and other status signals. For instance, in case the MSD coordinator function 450 fails or some reason, such as not being able to allocate forces successfully, or suffers from some other failure mode, then a message can be sent to the dynamic longitudinal slip limit configuration module 440, which may then assume the role of MSD coordinator function in addition to slip limit configuration function. An example of vehicle motion control based on modified Hamiltonians is given in Gao, Yangyan, Mathias Lidberg, and Timothy Gordon. "Modified Hamiltonian algorithm for optimal lane change with application to collision avoidance." MM Science Journal (2015): 576-584. Further applications of Hamiltonian theory of vehicle motion control are described in Gao, Yangyan, and Timothy Gordon. "Optimal control of vehicle dynamics for the prevention of road departure on curved roads." IEEE Transactions on Vehicular Technology 68.10 (2019): 9370-9384, and Gao, Yangyan, Timothy Gordon, and Mathias Lidberg. "Optimal control of brakes and steering for autonomous collision avoidance using modified Hamiltonian algorithm." Vehicle system dynamics 57.8 (2019): 1224-1240.

Thus, according to some aspects the dynamic longitudinal slip limit configuration module 440 is arranged as a redundant MSD coordinator. In case the primary MSD coordinator function 450 fails for some reason, the dynamic longitudinal slip limit configuration module 440 steps in and assumes MSD control. This MSD control may optionally involve performing a safety maneuver, i.e., changing lanes and stopping at a safe location.

Figure 5:
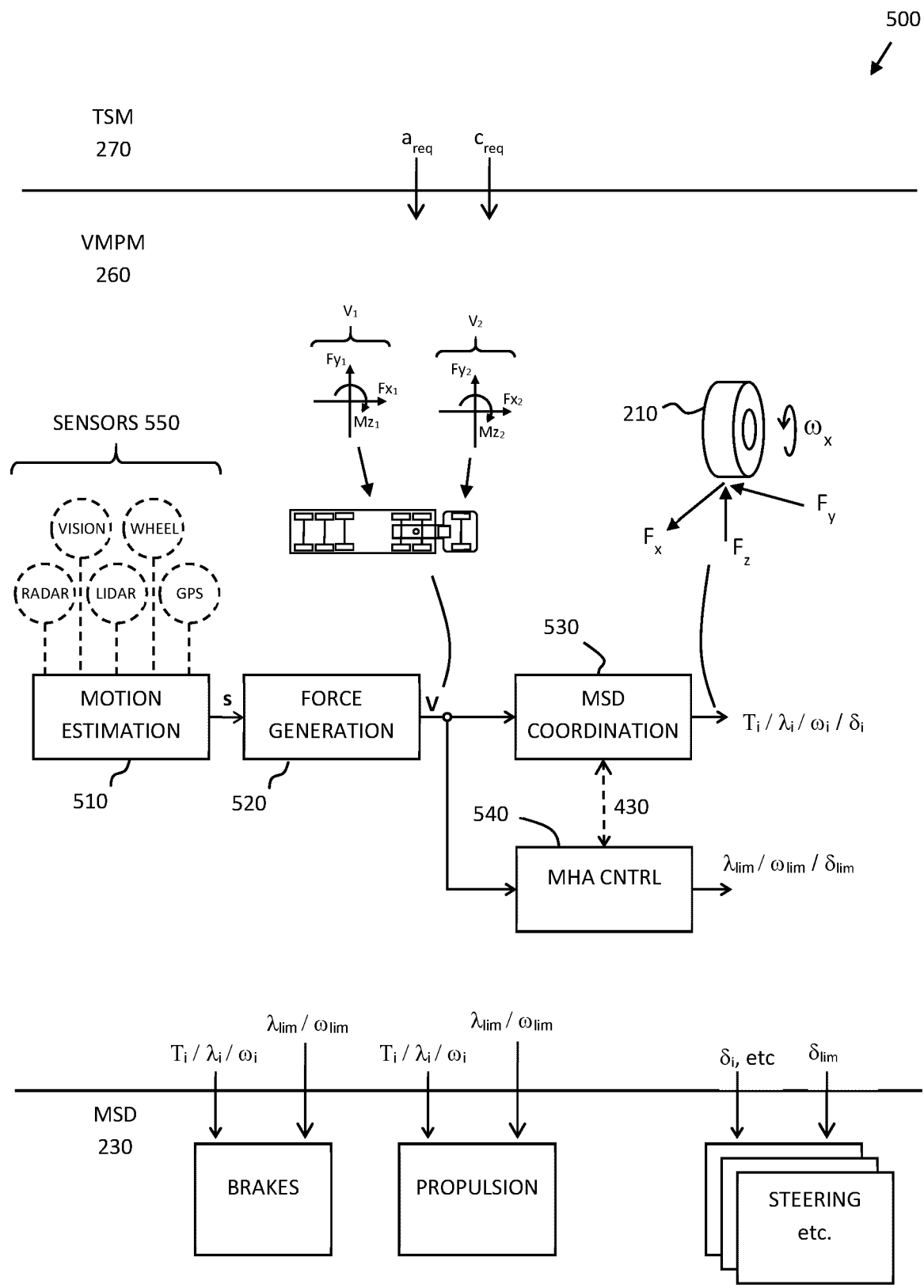

FIG. 5 illustrates an example control architecture suitable for controlling motion of a heavy-duty vehicle, such as the vehicle 100 discussed above in connection to FIG. 1. In this example, the dynamic longitudinal slip limit configuration module 440 is implemented as a modified Hamiltonian algorithm which will be discussed in more detail below in connection to FIG. 8 and FIG. 9. Note the optional safety signal interconnect 430 which was discussed above.

The VMPM function 260 operates with a time horizon of about 1 second or so, and continuously transforms the acceleration profiles $a_{req}$ and curvature profiles $c_{req}$ from the TSM layer 270 into control commands for controlling vehicle motion functions, actuated by the different MSDs 220, 250 of the vehicle 100 which report back capabilities to the VMPM, which in turn are used as constraints in the vehicle control. The VMPM function 260 performs vehicle state or motion estimation 510, i.e., the VMPM function 260 continuously determines a vehicle state s comprising positions, speeds, accelerations, and articulation angles of the different units in the vehicle combination by monitoring operations using various sensors 550 arranged on the vehicle 100, often but not always in connection to the MSDs 220, 250.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 530 which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors, steering angle sensors and/or lidar sensors, and translating this vehicle unit motion into a local coordinate system of a given wheel 210 (in terms of, e.g., longitudinal and lateral velocity components), it becomes possible to accurately estimate wheel slip in real time by comparing the vehicle unit motion in the wheel reference coordinate system to data obtained from the wheel speed sensor 240 arranged in connection to the wheel 210.

A tyre model, which was discussed above in connection to FIG. 3, can be used to translate between a desired longitudinal tyre force $Fx_i$ for a given wheel i and an equivalent wheel slip $\lambda_i$ for the wheel. Wheel slip $\lambda$ relates to a difference between wheel rotational velocity and speed over ground and will be discussed in more detail below. Wheel speed $\omega$ is a rotational speed of the wheel, given in units of, e.g., rotations per minute (rpm) or angular velocity in terms radians/second (rad/sec) or degrees/second (deg/sec).

Herein, a tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, according to some aspects of the present disclosure, the VMPM function 260 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface 265 between VMPM and MSDs capable of delivering torque to the vehicle's wheels has, traditionally, been focused on torque based requests to each MSD from the VMPM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip based request on the interface 265 between VMPM and the MSD controller or controllers 230, thereby shifting the difficult actuator speed control loop to the MSD controllers, which generally operate with a much shorter sample time compared to that of the VMPM function. Such an architecture can provide much better disturbance rejection compared to a torque based control interface and thus improves the predictability of the forces generated at the tyre road contact patch.

Longitudinal wheel slip $\lambda$ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda$ is bounded between $-1$ and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The VMPM 260 and optionally also the MSD control unit 230 maintains information on $v_x$ (in the reference frame of the wheel), while a wheel speed sensor 240 or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre 210 is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_x \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

In the technical field of vehicle dynamics, slip angle or sideslip angle $\alpha$ is the angle between the direction in which a wheel is pointing and the direction in which it is actually traveling (i.e., the angle between the forward velocity vector $v_x$ and the vector sum of wheel forward velocity $v_x$ and lateral velocity $v_y$. This slip angle results in a force, the cornering force, which is in the plane of the contact patch and perpendicular to the intersection of the contact patch and the midplane of the wheel. The cornering force increases approximately linearly for the first few degrees of slip angle, then increases non-linearly to a maximum before beginning to decrease.

The slip angle, $\alpha$ is defined as $$\alpha = \arctan\left(\frac{v_y}{|v_x|}\right)$$

Figure 6:
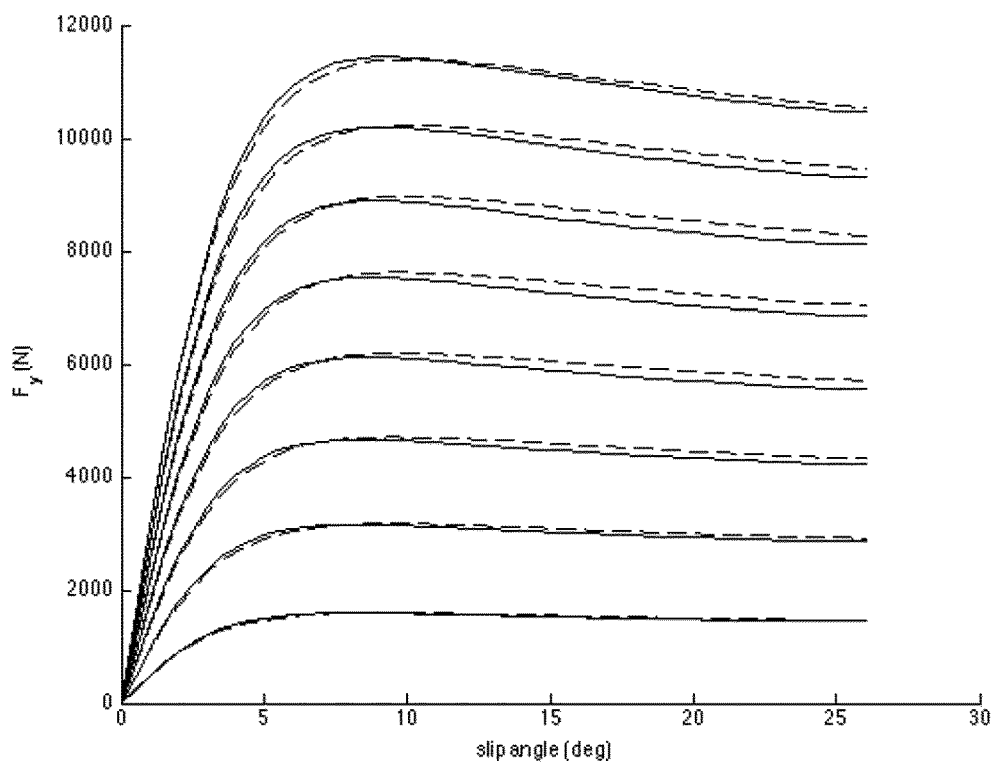
FIG. 6 is a graph showing wheel lateral force as function of slip angle.
Figure 7:
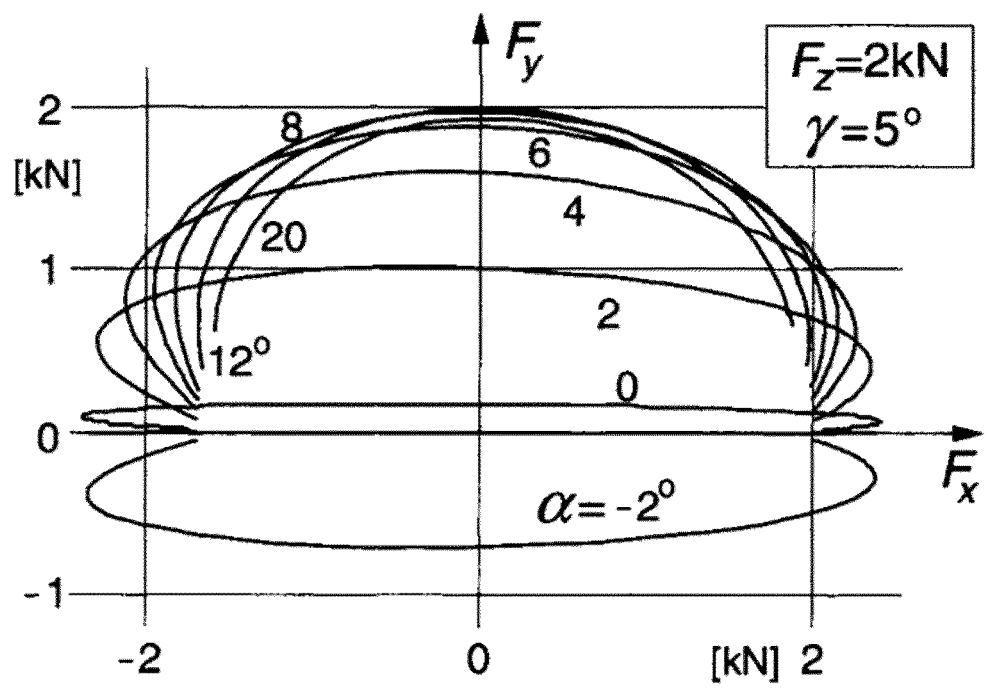
FIG. 7 schematically illustrates longitudinal and lateral tyre force interaction.

FIG. 6 is a graph showing wheel lateral force as function of slip angle. FIG. 6 shows typical pure lateral slip characteristics, in this case with zero longitudinal slip. A pure slip condition is herein defined as a situation when either longitudinal or lateral slip occurs in isolation. For the combined slip condition, which is demonstrated in FIG. 3, lateral force drops significantly with longitudinal slip. A more illustrative presentation of the combined slip condition, longitudinal and lateral tyre force interaction is shown in FIG. 7. Here, the example is given for normal tyre force $F_z$=2 kN and a camber angle $\gamma$ of 5 degrees, where the same characteristic applies for all load and camber conditions. As shown in FIG. 7, when longitudinal and lateral tyre forces are bounded within the so called 'friction circle', the lateral tyre forces diminish with the increase of longitudinal forces, and vice versa.

Figure 8:
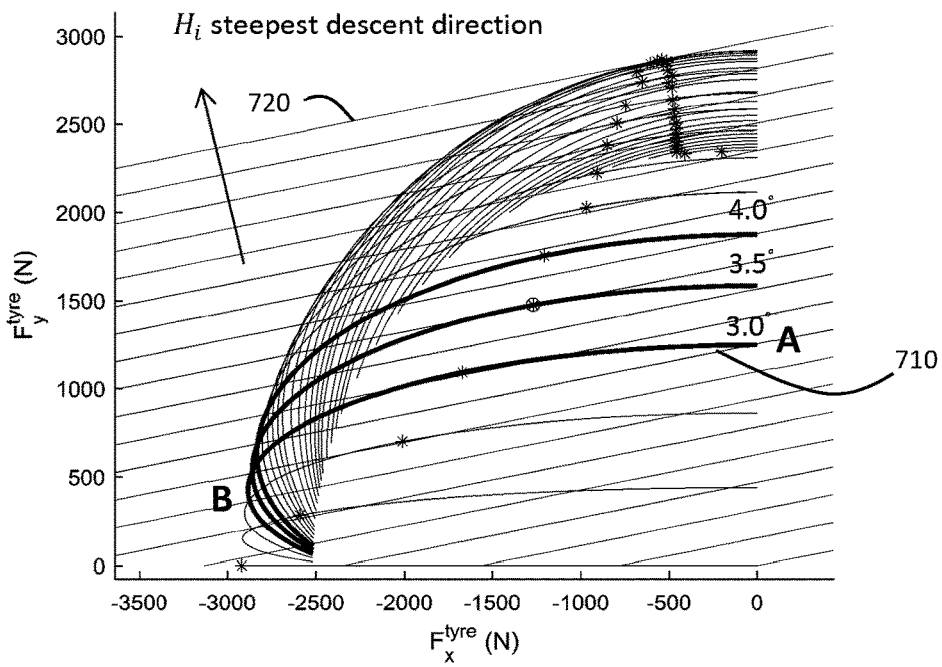
FIG. 8 is a graph showing wheel force maps for different slip angles.

FIG. 8 is a graph showing wheel force maps for different slip angles. Each solid curve 710 represents the range of forces available due to changes in braking torque for a given slip angle, with terminal value corresponding to a locked wheel. For instance, the curve 710 starts at A where almost no torque is applied. Higher and higher braking torque is then applied until a point B where maximum longitudinal force is being generated. After this point non-linear behavior causes the longitudinal force to decrease if even more braking torque is applied. The graph also shown curves corresponding to Hamiltonian values. The graph in FIG. 8 is explained in more detail in "Vehicle Motion and Stability Control at the Limits of Handling via the Modified Hamiltonian Algorithm: Methodology and Applications", doctoral thesis, Gao Yangyan, University of Lincoln, College of Science, School of Engineering, August 2018.

Figure 9:
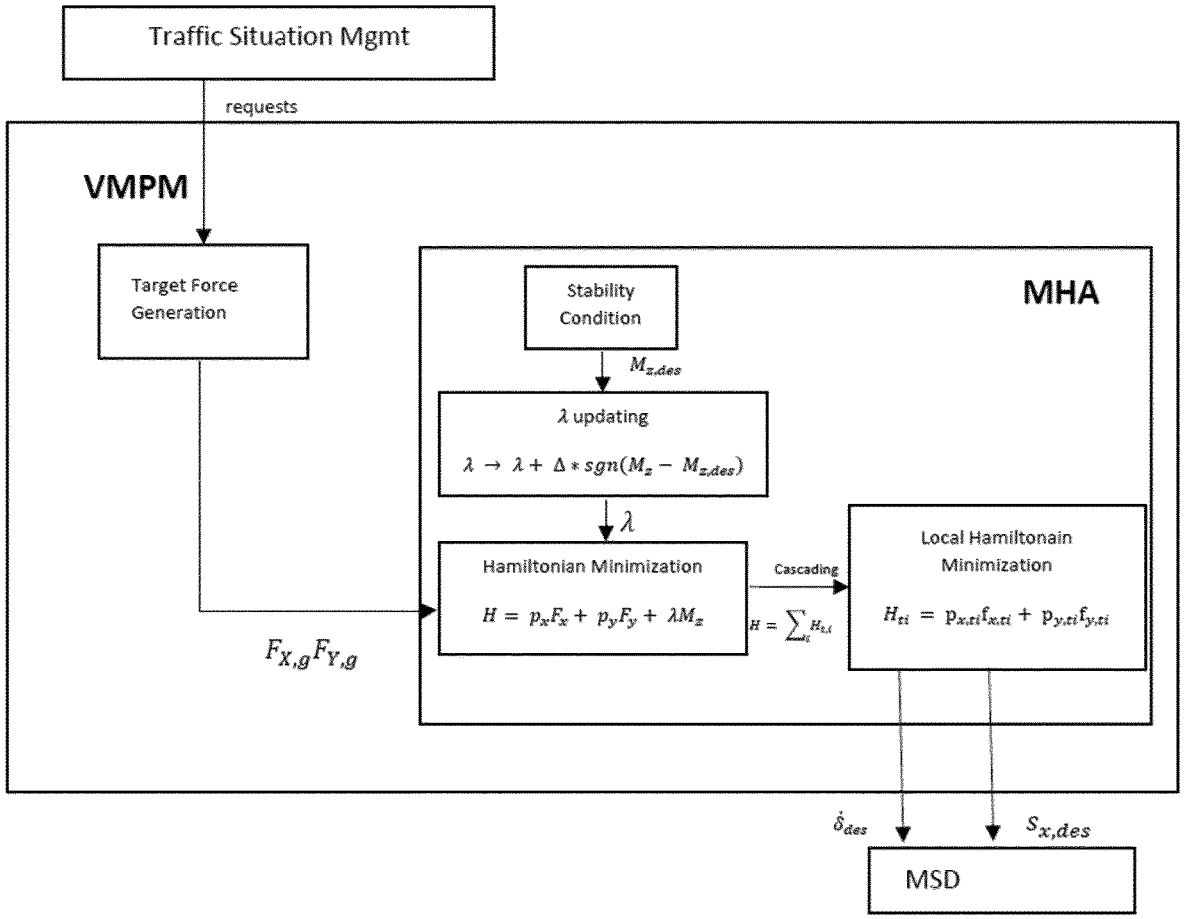
FIG. 9 shows an example of a Hamiltonian-based control method.

The dynamic configuration of slip limits, e.g., in the dynamic longitudinal slip limit configuration module 440 shown in FIG. 4, can be implemented advantageously using a modified Hamiltonian (MHA) framework. FIG. 9 shows an example system diagram of how MHA may in determining slip limits. Consider the Hamiltonian function for a three degrees of freedom (3DOF) vehicle model and assume the vehicle operation condition is at the limits of friction, therefore only terminal cost function J is present. The Hamiltonian function is linear in virtual control inputs ($F_x$, $F_y$, $M_z$), $H = P_x F_x + P_y F_y + \lambda M_z$, where $P_x P_y \lambda$ are time-varying Lagrange multipliers or co-states of the dynamic system which reflect the gradient cost with respect to each state (here global forces and moment). According to Pontryagin's minimum principle, minimization of the scalar Hamiltonian function H at each time step is equivalent to minimizing the cost function J for the entire optimization duration. The states and co-states can be solved numerically off-line, which is often referred to as a two-point boundary value problem. However, it is often computationally too costly to be implemented in an on board electronic control unit (ECU) to solve such optimization problems, especially when the degrees of freedom of the dynamic system becomes large. In the MHA method, the co-state values are instead estimated to meet a high-level reference (global longitudinal and lateral forces). Therefore $P_x$, $P_y$ should point in the opposite direction as Fx and Fy (to achieve a minimization of the Hamiltonian function). So $$p = [P_x, P_y] = -a^d/|a^d|$$

and $$a^d = \left[\frac{Fx}{M}, \frac{Fy}{M}\right]$$

where M is the vehicle total mass in kg, $a^d$ is the desired acceleration vector, Fx and Fy are the global forces references derived from the motion request of the TSM layer 270. In a vehicle motion control application, it is not only the global forces requirements which are important, but also the stability of the vehicle. Here the co-state λ is associated with the yaw moment $M_z$, to be specific λ is updated continuously to track a desired yaw moment $M_{z,d}$ to ensure the stability of the vehicle. The formulation of $M_{z,d}$ can vary somewhat depending on different stability requirements etc. It is often related to yaw rate error from the reference yaw rate and sideslip angle at the center of gravity location. Because the Hamiltonian function is a scalar function and linear with virtual controls, it can be rewritten from global coordinates (superscript g denotes values in a global coordinate system) to the vehicle coordinates (denoted instead by superscript v):

$$H = \begin{bmatrix} p_x^g & p_y^g \end{bmatrix} \begin{bmatrix} F_x^g \\ F_y^g \end{bmatrix} +$$

$$\lambda \ M_z = \begin{bmatrix} p_x^g & p_y^g \end{bmatrix} R(\psi) \begin{bmatrix} F_x^v \\ F_x^v \end{bmatrix} + \lambda \ M_z = \begin{bmatrix} p_x^v & p_y^v \end{bmatrix} \begin{bmatrix} F_x^v \\ F_y^v \end{bmatrix} + \lambda \ M_z$$

where $[p_x^v \ p_y^v]$ represent co-states in vehicle coordinates:

$$[p_x^v p_y^v] = [p_x^g p_y^g] R(\psi)$$

Here, ψ represents the yaw angle of the vehicle, and R(ψ) is a rotational matrix for rotation by ψ. Note that both $[F_x^g \ F_y^g]$ and $[F_x^v \ F_y^v]$ are exerted on the center of gravity location. By expanding the Hamiltonian function H to include all the contribution forces from the tyres, one can write $$H = p_x^v \sum_i F_{x,i}^v + p_x^v \sum_i F_{y,i}^v + \lambda(x_i \ F_{y,i}^v - y_i \ F_{x,i}^v) =$$

$$\sum_i (p_x^v + \lambda \ x_i) \ F_{x,i}^v + (p_x^v - \lambda \ y_i) F_{y,i}^v = \sum_i H_i$$

Where $[\tilde{p}_{x,i}^v \ \tilde{p}_{y,i}^v] = [(p_x^v + \lambda x_i) \ (p_x^v - \lambda y_i)]$ is a co-state vector associated with each tyre, and the local Hamiltonian function (in vehicle coordinates) for each tyre can be written as:

$$H_i = \tilde{p}_{x,i}^v F_{x,i}^v + \tilde{p}_{y,i}^v F_{y,i}^v$$

Since the scalar product $H_i$ is the same in tyre and in vehicle coordinates, it is possible to rewrite $H_i$ in the tyre coordinate system (denoted by superscript t). Applying the rotational matrix $R(\delta_i)$ as $$H_i = \begin{bmatrix} \tilde{p}_{x,i}^v & \tilde{p}_{y,i}^v \end{bmatrix} R(\delta_i) \begin{bmatrix} F_{x,i}^t \\ F_{y,i}^t \end{bmatrix} = \begin{bmatrix} \tilde{p}_{x,t}^t & \tilde{p}_{y,t}^t \end{bmatrix} \begin{bmatrix} F_{x,i}^t \\ F_{y,i}^t \end{bmatrix}$$

where $$[\tilde{p}_{x,t}^t \tilde{p}_{y,t}^t] = [\tilde{p}_{x,i}^v \tilde{p}_{y,i}^v] R(\delta_i)$$

Now, minimizing the global Hamiltonian function (H) becomes equivalent to minimizing the local Hamiltonian function ($H_i$).

FIG. 8 shows a practical example of how the Hamiltonian function $H_i$ is minimized over iterations in time. As noted above, the series of tyre curves represent the range of tyre forces available due to changes in braking torque for a range of tyre sideslip angles. At each computational time instant, i.e., at each iteration, the local co-states $[\tilde{p}_{x,t}^t \ \tilde{p}_{y,t}^t]$ are estimated according to the formula, which determines the slop of the Hamiltonian function, represented by the series of straight lines 720. The $H_i$ steepest descent direction is perpendicular to the constant $H_i$ lines. Given the current slip angle of the tyre (3.5 degrees for example), the minimum $H_i$ is reached at the circle marker, which corresponds to a braking force around −1250 N and the longitudinal slip ratio (determined by the aforementioned tyre model). In the actual implementation, a range of slip ratios [−0.2:0.001:0] is swept through as the optimal control variable to the combined slip tyre model, together with other inputs such as slip angle α, tyre normal load $F_z$ (both can be estimated on fly), to calculate the constant $H_i$. To find the minimum $H_i$ a linear one dimensional search is performed. This process is repeated each iteration, typically around 10 ms, for each of the wheels on the vehicle 100. The optimal longitudinal slips determined in this manner provides the dynamic slip limits which constitute the output of the control allocator 450.

Figure 10:
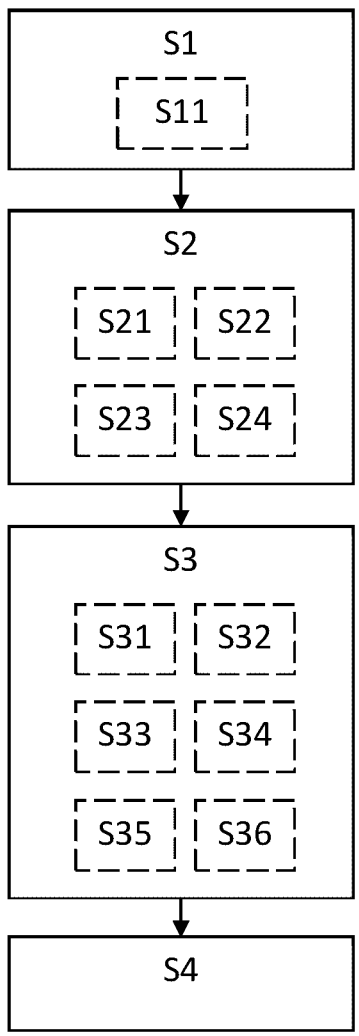
FIG. 10 is a flow chart illustrating a method.

FIG. 10 is a flow chart illustrating methods which summarize at least some of the discussions above. There is illustrated a computer-implemented method performed in a vehicle control unit 130, 140 for controlling motion of a heavy-duty vehicle 100. The method comprises obtaining S1 a vehicle motion request, wherein the vehicle motion request is indicative of a target curvature $c_{req}$ and a target acceleration $a_{req}, c_{req}$. This motion request may, e.g., be obtained S11 from a driver input and/or from an autonomous or semi-autonomous TSM function 270, as discussed above in connection to FIGS. 2, 4, and 5.

The method also comprises determining S2 an MSD control allocation $T_i/\lambda_i/\omega_i/\delta_i$ based on the vehicle motion request. This MSD control allocation is determined as a force allocation which generates a vehicle motion in accordance with the motion request. According to aspects, the method comprises determining S21 the MSD control allocation $T_i/\lambda_i/\omega_i/\delta_i$ based on a B-matrix control allocation method based on an optimization evolving the vehicle motion request and a motion model of the vehicle. B-matrix control allocation methods are generally known and will therefore not be discussed in more detail herein. The MSD control may at least partly be determined S22 as a target wheel torque $T_i$. MSDs such as friction brakes and various propulsion devices may be controlled based on a target torque. This target torque is submitted to the respective MSD controller as a torque request, whereupon the MSD controller controls the MSAD to generate an actual torque corresponding to the torque request. According to other aspects, the method comprises determining S23 the MSD control allocation at least partly as a target wheel slip $\lambda_i$ or wheel speed relative to ground $\omega_i$. This type of control is associated with some advantages. For instance, a controlled vehicle start may be achieved in an efficient manner, since control is based directly on wheel slip, or wheel speed difference with respect to the velocity of the vehicle, as opposed to more traditional forms of torque-based control. Control is then shifted more towards the propulsion unit or units and away from central vehicle control, which is an advantage since control loops of higher bandwidth (faster loops) can be realized in this manner. Unforeseen resistances and transients can be better handled due to the increased control bandwidth locally compared to centrally. The MSD control allocation may also comprise determining S24 the MSD control allocation at least partly as a target steering angle $\delta_i$. This target steering angle will generate lateral force in accordance with the obtained vehicle motion request. It is noted that the target steering angle may be advantageously controlled in dependence of the predicted sideslip. Sideslip can in some cases have a profound effect on the possibility of generating wheel force, as was discussed above in connection to FIG. 6 and FIG. 8. In some scenarios, it may be beneficial to reduce the steering angle and instead steer by braking, i.e., apply a different torque on the two sides of a vehicle unit in order to generate a yaw moment.

The method also comprises determining S3 a dynamic longitudinal wheel slip limit $\lambda_{lim}/\omega_{lim}$ based on the vehicle motion request and separately from the MSD control allocation, where the dynamic longitudinal wheel slip limit increases with a decreasing target curvature. This part of the method is key to obtaining the main advantages discussed above. By configuring the slip limits dynamically, smaller margins can be used as long as no significant lateral forces are required to meet the motion requests from the higher layer control functions. The techniques disclosed herein provide examples of methods which are able to determine suitable slip limits that allow generation of the required wheel forces, and which are not unnecessarily limiting the ability to, e.g., generate longitudinal wheel force. The methods therefore increase the maneuverability of a heavy-duty vehicle, such as the vehicle 100 discussed above in connection to FIG. 1. Consequently, controlling S4 the motion of the heavy-duty vehicle 100 based on the MSD control allocation constrained by the dynamic longitudinal wheel slip limit implies an improved performance by the vehicle 100.

According to some aspects, the method comprises determining S31 the dynamic longitudinal wheel slip limit $\lambda_{lim}/\omega_{lim}$ based on a current wheel slip angle $\alpha$ and on a required lateral force, where the dynamic longitudinal wheel slip limit $\lambda_{lim}/\omega_{lim}$ decreases if the current wheel slip angle $\alpha$ increases. Thus, if the vehicle is skidding sideways, then a smaller amount of longitudinal slip is allowed. The mechanisms behind this principle were discussed above and is exemplified in FIG. 7.

Additionally, the methods may comprise determining S32 a dynamic steering angle limit $\delta_{lim}$ in addition to the dynamic longitudinal wheel slip limit $\lambda_{lim}/\omega_{lim}$. This dynamic steering angle limit effectively limits wheel sideslip, which is an advantage. The methods may also comprise determining the dynamic longitudinal wheel slip limit $\lambda_{lim}/\omega_{lim}$ by executing S34 a modified Hamiltonian algorithm (MHA), where the MHA optionally comprises minimizing S35 local Hamiltonian functions at one or more wheels, where each minimization comprises a linear search of a tyre force curve. This approach to determining wheel slip limits were discussed in detail above in connection to FIG. 9. As part of this approach, the methods may also comprise determining S36 the dynamic longitudinal wheel slip limit $\lambda_{lim}/\omega_{lim}$ based on a stability condition involving a maximum acceptable yaw moment $M_z$ of the vehicle 100.

Figure 11:
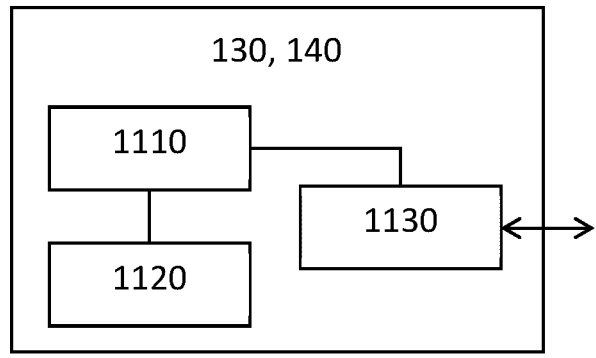
FIG. 11 schematically illustrates a control unit.

FIG. 11 schematically illustrates, in terms of a number of functional units, the components of a control unit such as the VCU 130, 140. The control unit may implement one or more of the above discussed functions of the TSM 270, VMPM 260 and/or the MSD control function 230, according to embodiments of the discussions herein. The control unit is configured to execute at least some of the functions discussed above for control of a heavy-duty vehicle 100. Processing circuitry 1110 is provided using any combination of one or more of a suitable central processing unit CPU, multiprocessor, microcontroller, digital signal processor DSP, etc., capable of executing software instructions stored in a computer program product, e.g. in the form of a storage medium 1120. The processing circuitry 1110 may further be provided as at least one application specific integrated circuit ASIC, or field programmable gate array FPGA.

Particularly, the processing circuitry 1110 is configured to cause the control unit 101 to perform a set of operations, or steps, such as the methods discussed in connection to FIG. 10. For example, the storage medium 1120 may store the set of operations, and the processing circuitry 1110 may be configured to retrieve the set of operations from the storage medium 1120 to cause the control unit 130, 140 to perform the set of operations. The set of operations may be provided as a set of executable instructions. Thus, the processing circuitry 1110 is thereby arranged to execute methods as herein disclosed.

The storage medium 1120 may also comprise persistent storage, which, for example, can be any single one or combination of magnetic memory, optical memory, solid state memory or even remotely mounted memory.

The control unit 130, 140 may further comprise an interface 1130 for communications with at least one external device. As such the interface 1130 may comprise one or more transmitters and receivers, comprising analogue and digital components and a suitable number of ports for wireline or wireless communication.

The processing circuitry 1110 controls the general operation of the control unit 130, 140, e.g., by sending data and control signals to the interface 1130 and the storage medium 1120, by receiving data and reports from the interface 1130, and by retrieving data and instructions from the storage medium 1120. Other components, as well as the related functionality, of the control node are omitted in order not to obscure the concepts presented herein.

Figure 12:
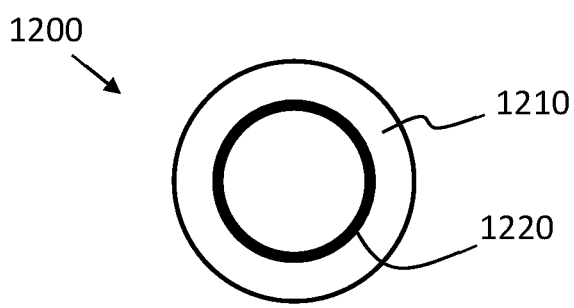
FIG. 12 shows an example computer program product.

FIG. 12 illustrates a computer readable medium 1210 carrying a computer program comprising program code means 1220 for performing the methods illustrated in FIG. 10, when said program product is run on a computer. The computer readable medium and the code means may together form a computer program product 1200.

The invention claimed is:

1. A computer-implemented method performed in a vehicle control unit for controlling motion of a heavy-duty vehicle, the method comprising:
   obtaining a vehicle motion request, wherein the vehicle motion request is indicative of a target curvature and a target acceleration;
   determining a motion support device (MSD) control allocation based on the vehicle motion request;
   determining a dynamic longitudinal wheel slip limit based on the vehicle motion request and separately from the MSD control allocation, where the dynamic longitudinal wheel slip limit increases with a decreasing target curvature, and where the dynamic longitudinal wheel slip limit is determined by minimizing local Hamiltonian functions at one or more wheels; and
   controlling the motion of the heavy-duty vehicle based on the MSD control allocation constrained by the dynamic longitudinal wheel slip limit.

2. The method of claim 1, comprising obtaining the vehicle motion request from a driver input and/or from an autonomous or semi-autonomous traffic situation management (TSM) function.

3. The method of claim 1, comprising determining the MSD control allocation based on a B-matrix control allocation method.

4. The method of claim 1, comprising determining the MSD control allocation at least partly as a target wheel torque.

5. The method of claim 1, comprising determining the MSD control allocation at least partly as a target wheel slip or wheel speed relative to ground.

6. The method of claim 1, comprising determining the MSD control allocation at least partly as a target steering angle.

7. The method of claim 1, comprising determining the dynamic longitudinal wheel slip limit based on a current wheel slip angle and on a required lateral force, where the dynamic longitudinal wheel slip limit decreases if the current wheel slip angle increases.

8. The method of claim 1, comprising determining a dynamic steering angle limit in addition to the dynamic longitudinal wheel slip limit.

9. The method of claim 1, wherein each minimization of local Hamiltonian functions at one or more wheels comprises a linear search of a tire force curve.

10. The method of claim 1, comprising determining the dynamic longitudinal wheel slip limit based on a stability condition involving a maximum acceptable yaw moment of the vehicle.

11. A computer program product comprising program code for performing, when executed by a computer, the steps of claim 1.

12. A non-transitory computer readable medium comprising a computer program comprising program code, which when executed by a computer, performs the steps of claim 1.

13. A control unit, comprising:
processing circuitry;
an interface coupled to the processing circuitry; and
a memory coupled to the processing circuitry, wherein the memory comprises machine readable computer program instructions that, when executed by the processing circuitry, causes the control unit to perform operations of:
obtaining a vehicle motion request, wherein the vehicle motion request is indicative of a target curvature and a target acceleration;
determining a motion support device (MSD) control allocation based on the vehicle motion request;
determining a dynamic longitudinal wheel slip limit based on the vehicle motion request and separately from the MSD control allocation, where the dynamic longitudinal wheel slip limit increases with a decreasing target curvature, and where the dynamic longitudinal wheel slip limit is determined by minimizing local Hamiltonian functions at one or more wheels; and
controlling the motion of the heavy-duty vehicle based on the MSD control allocation constrained by the dynamic longitudinal wheel slip limit.

14. A heavy-duty vehicle comprising the control unit of claim 13.

* * * * *